(12) United States Patent
Kerscher

(10) Patent No.: US 9,618,649 B2
(45) Date of Patent: Apr. 11, 2017

(54) DETECTING AN OVERALL DIMENSION OF A PLATE-SHAPED WORKPIECE BY A NON-CONTACT SENSOR

(71) Applicant: TRUMPF Werkzeugmaschinen GmbH + Co. KG, Ditzingen (DE)

(72) Inventor: Stefan Kerscher, Walzbachtal (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 14/554,587

(22) Filed: Nov. 26, 2014

(65) Prior Publication Data
US 2015/0146218 A1 May 28, 2015

(30) Foreign Application Priority Data
Nov. 27, 2013 (EP) .................................... 13194680

(51) Int. Cl.
*G01B 11/00* (2006.01)
*G01V 8/10* (2006.01)
*B21D 28/04* (2006.01)
*B21D 28/26* (2006.01)
*B21D 43/10* (2006.01)
*G01B 11/02* (2006.01)

(52) U.S. Cl.
CPC ................ *G01V 8/10* (2013.01); *B21D 28/04* (2013.01); *B21D 28/265* (2013.01); *B21D 43/10* (2013.01); *G01B 11/028* (2013.01)

(58) Field of Classification Search
USPC .......................................... 399/111; 356/625
See application file for complete search history.

(56) References Cited

U.S. PATENT DOCUMENTS

| 5,721,587 | A | 2/1998 | Hirose |
| 7,742,736 | B2* | 6/2010 | Kobayashi ......... G03G 15/6529 271/226 |
| 9,122,219 | B2* | 9/2015 | Ikeda ........................ B65H 1/04 |
| 2003/0080487 | A1* | 5/2003 | Tamura et al. ............. 270/58.07 |
| 2005/0191065 | A1* | 9/2005 | Sawanaka et al. ............. 399/16 |
| 2008/0226155 | A1 | 9/2008 | Bytow |
| 2014/0064812 | A1* | 3/2014 | Liu et al. ........................ 399/361 |

FOREIGN PATENT DOCUMENTS

| EP | 1970667 A1 | 9/2008 |
| JP | 61155803 A | 7/1986 |
| JP | 2002172440 A | 6/2002 |
| JP | 2006030010 A | 2/2006 |

* cited by examiner

*Primary Examiner* — Quana M Grainger
(74) *Attorney, Agent, or Firm* — Fish & Richardson P.C.

(57) ABSTRACT

A method of detecting an overall dimension of a plate-shaped workpiece to be processed on a processing machine by a contactless-acting sensor includes moving the workpiece by a motion device of the processing machine in a predetermined direction until the sensor detects a first workpiece edge by a first change of state, detecting a first position of the workpiece where the first change of state happens by an evaluation device connected to the sensor, moving the workpiece by the motion device in a direction toward a second workpiece edge until the sensor detects the second workpiece edge by a second change of state, detecting a second position of the workpiece where the second change of state happens by the evaluation device, and determining an overall dimension of the workpiece by a determination of a distance between the first position and the second position of the workpiece.

21 Claims, 3 Drawing Sheets

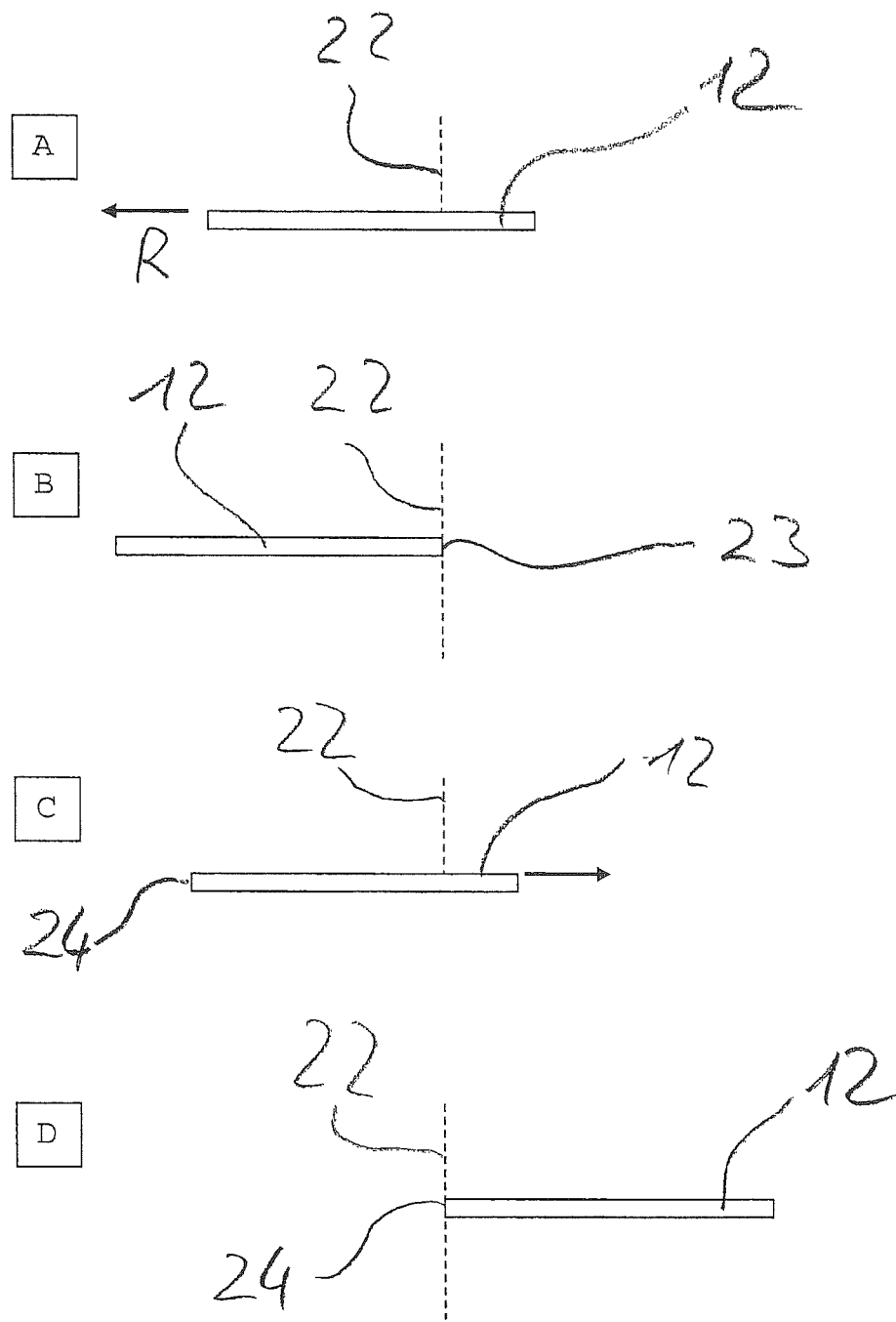

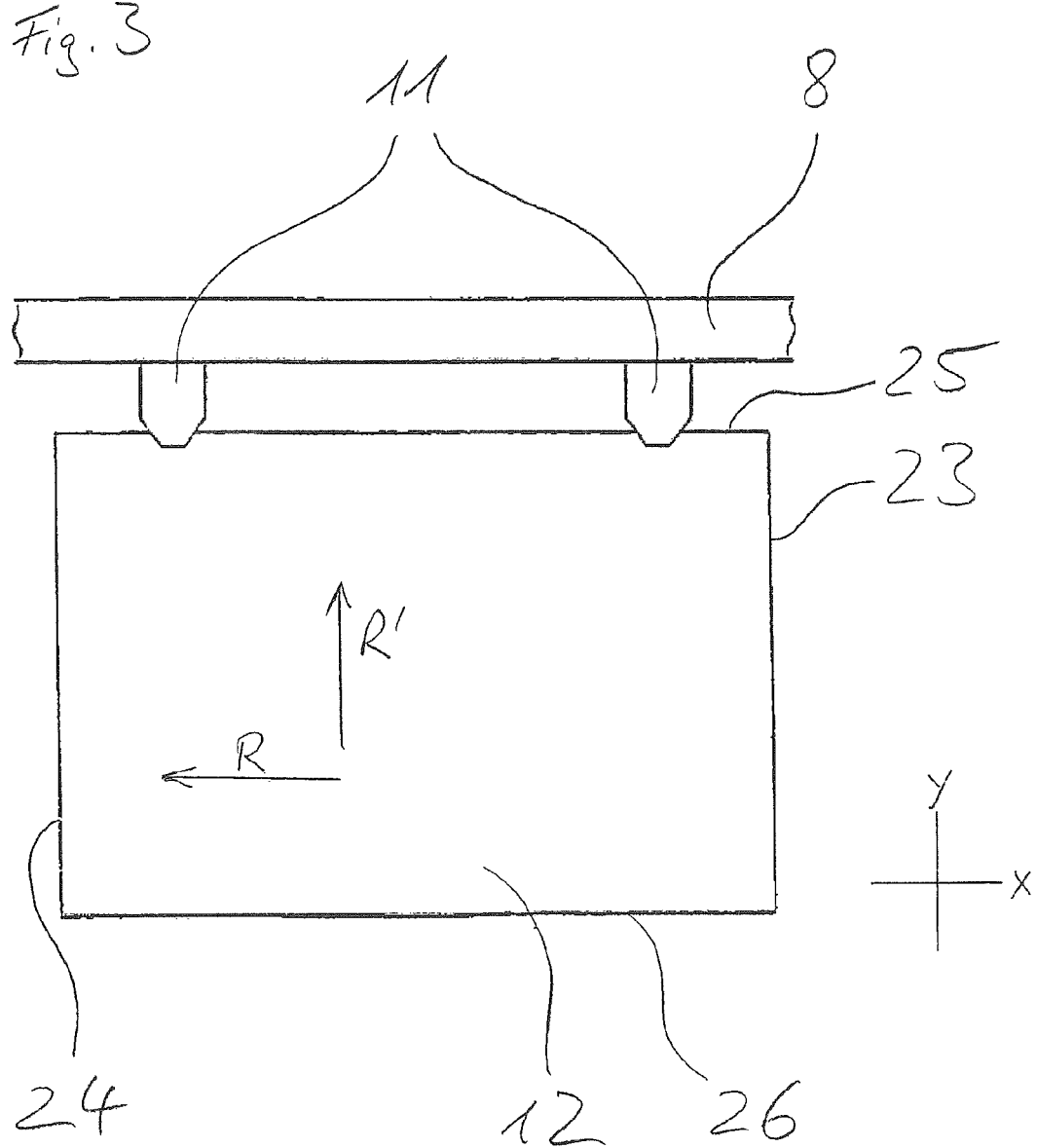

DETECTING AN OVERALL DIMENSION OF A PLATE-SHAPED WORKPIECE BY A NON-CONTACT SENSOR

CROSS REFERENCE TO RELATED APPLICATION

This application claims priority under 35 U.S.C. §119(a) to European Application No. 13 194 680.8, filed on Nov. 27, 2013, the entire contents of which are hereby incorporated by reference.

TECHNICAL FIELD

The invention relates to methods, devices and systems for detecting a plate-shaped workpiece, in particular, for detecting an overall dimension of a plate-shaped workpiece to be processed on a workpiece processing machine.

BACKGROUND

Devices for detecting overall dimensions of materials can, for example, use a feeding device having adjustable grippers for feeding a sheet material and determine an overall dimension of the sheet material by the distance of the grippers. Alternative devices use, e.g., movable claws of a punching machine, to determine the overall dimension by means of tactile stoppers.

SUMMARY

One aspect of the invention features a method of detecting an overall dimension of a plate-shaped workpiece to be processed on a workpiece processing machine by a contactless-acting sensor. The sensor is connected to an evaluation device and configured to detect a presence of the workpiece and an absence of the workpiece as well as a change of state from the presence to the absence or from the absence to the presence at a predetermined position of the workpiece relative to the sensor. The method includes: moving, by a motion device of the workpiece processing machine, the workpiece in a first predetermined direction until the sensor detects a first workpiece edge of the workpiece by a first change of state; causing reciprocal relative motion between the sensor and the workpiece with the sensor at the first workpiece edge; detecting, by an evaluation device coupled to the sensor, a first position of the workpiece associated with the first change of state; moving, by the motion device, the workpiece in a direction toward a second workpiece edge of the workpiece until the sensor detects the second workpiece edge by a second change of state; causing reciprocal relative motion between the sensor and the workpiece with the sensor at the second workpiece edge; detecting, by the evaluation device, a second position of the workpiece associated with the second change of state; and then determining a first overall dimension of the workpiece by a determination of a first distance between the first position and the second position of the workpiece.

When the sensor detects an absence of the workpiece before the first change of state, the motion towards the second workpiece edge may be carried out in the first predetermined direction. When the sensor detects a presence of the workpiece before the first change of state, the motion may be carried out in a direction opposite to the first predetermined direction.

By the method, an overall dimension of a workpiece can detected in a process-reliable and wear-free manner and, besides that, the determination of a position of the workpiece in the punching machine is possible.

By moving a workpiece and by detecting a first position of the workpiece in which a first workpiece edge is detected at a position, by means of a sensor, relative to the sensor, a further moving of the workpiece and detecting a second position of the workpiece in which a second workpiece edge is detected at the position relative to the sensor by means of the sensor, overall dimension and position of the workpiece can be detected in a wear-free manner. Thereby, it can be validated whether a batch of workpieces with suitable dimensions for a processing order is provided or whether a residual sheet metal of a previous order has a sufficient size for a subsequent order. Moreover, a position of the workpiece in the processing machine can be identified and violation of a dead zone can be prevented.

Other advantages of the invention will be appreciated from the description and the drawings. The features mentioned above and those set out below may also be used individually per se or together in any combination. The embodiments shown and described are not intended to be understood to be a conclusive listing but are instead of exemplary character for describing the invention.

DESCRIPTION OF DRAWINGS

FIG. 2 shows schematic views of different situations of detecting the overall dimensional of the workpiece by the sensor.

FIG. 3 shows a plane view of detecting the overall dimension of the workpiece.

DETAILED DESCRIPTION

Figure 1:
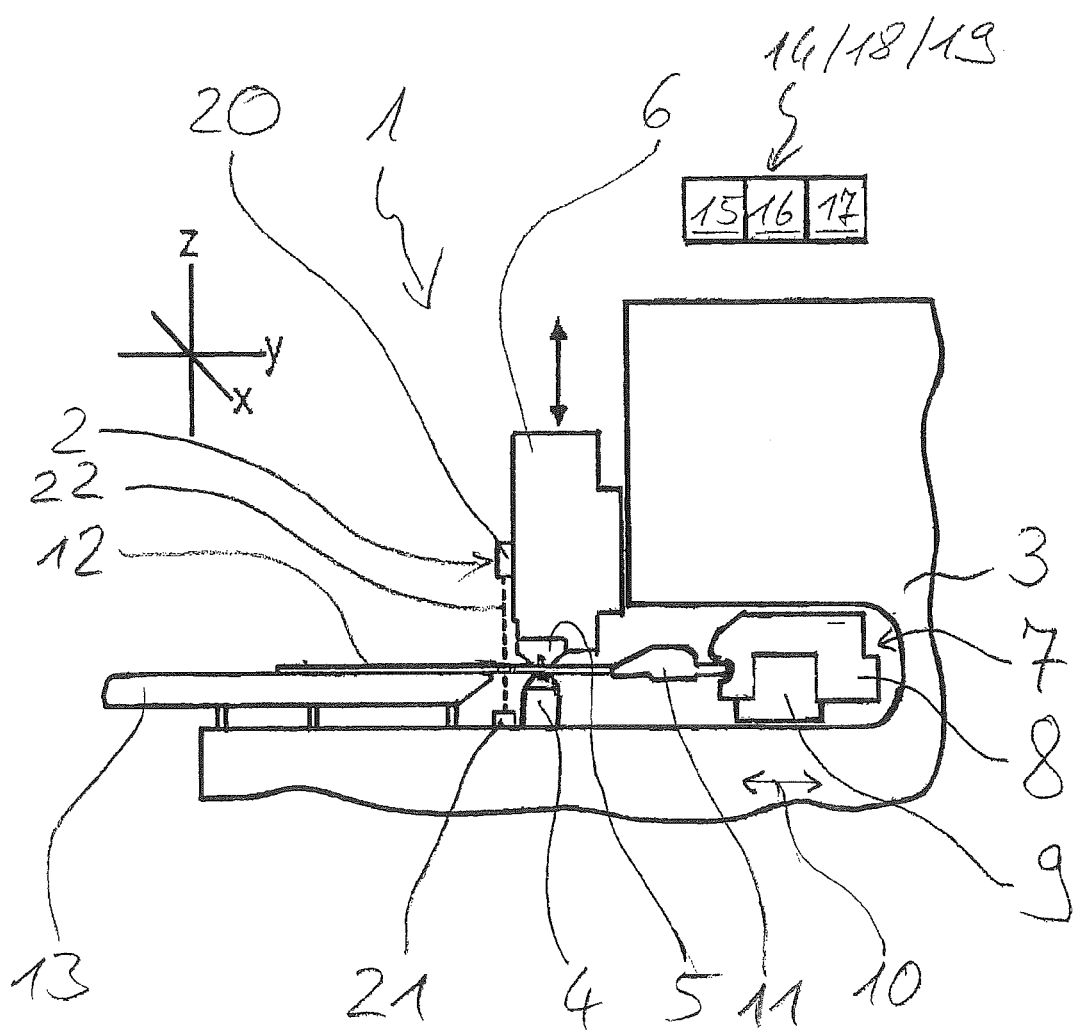
FIG. 1 shows an example processing machine having an example sensor for detecting an overall dimension of a workpiece.

In FIG. 1, a punching machine 1 having a sensor 2 is illustrated. The punching machine 1 is an example for a processing machine for processing plate-shaped workpieces. The sensor 2 can alternatively also be provided in an alternative processing machine, in particular, in a sheet metal processing machine, e.g., a laser cutting machine.

A component of the punching machine 1 is a C-frame 3 here. The C-frame 3 includes a torsion-stiff welding construction made of steel. The C-frame 3 can also be designed in another form.

The punching machine 1 comprises a lower tool holder 4 and an upper tool holder 5. The lower tool holder 4 is provided on the lower inside of the C-frame 3 for accommodating a lower tool part. In a movable press device 6, the upper tool holder 5 is provided above the lower tool holder 4 and it accommodates an upper tool part.

A motion device in the form of a conventional coordinate slideway 7 is provided in a throat space of the C-frame 3. A carriage 8 of the coordinate slideway 7 is displaceable in an X-direction along a guide rail 9 perpendicular to the drawing plane of FIG. 1. Together with the guide rail 9, the carriage 8 on the lower inside of the C-frame 3 can be displaced in direction of a double arrow 10 in a Y-direction.

At its front side, the carriage 8 of the coordinate slideway 7 is provided with several clamping claws 11, only one of which is visible in FIG. 1. The clamping claws 11 clamp in a usual manner the rim of a plate-shaped workpiece 12 to be processed by means of the punching machine 1. Further, the workpiece 12 is lying on a sheet metal support 13 provided on the lower inside of the C-frame 3. Due to the described movability of the carriage 8 of the coordinate slideway 7, the workpiece 12 can be displaced in a horizontal direction.

The punching machine 1 comprises a control computer 14 comprising, amongst others, an evaluation device 15, a motion controller 16 and a press controller 17. The control computer 14 is provided with an input unit 18 for inputting operating parameters or the like and with a display device 19 for displaying information about the operating condition of the punching machine 1. In alternative embodiments, e.g., in electrical punching machines, no press controller 17 is provided and its function is integrated in the motion controller 16.

Drivers (not shown) of the coordinate slideway 7 are controlled by the motion controller 16 and a motion of the press device 6 is controlled by the press controller 17. Machining programs and operating parameters are stored in a memory area of the control computer 14.

The punching machine 1 can further comprise the sensor 2 for detecting an overall dimension of the workpiece 12. The sensor 2 can be designed as a light barrier having a transmitter 20 and a separate receiver 21. A light beam 22 (e.g., a laser beam) is emitted by the transmitter 20 and received by the receiver 21. By the receipt or non-receipt of the light beam 22, an absence of the workpiece 12 or a presence of the workpiece 12 at a predetermined position relative to the sensor 2 is detected. Thus, a change of state from the absence to the presence or from the presence to the absence at the predetermined position here in the light beam 22 between the transmitter 20 and the receiver 21 is detected. Alternatively, alternative contactless-acting sensors, e.g., a light barrier, the light beam 22 of which is reflected by means of a reflector, can be used so that the transmitter and the receiver can be integrally in design. Further alternative options are pneumatically-acting sensors in case of which the presence/absence of the workpiece is detected by a back pressure of escaping air. Furthermore, capacitive sensors or, in case of ferromagnetic workpieces, inductive proximity switches are possible.

The transmitter 20 is affixed at the press device 6 and the receiver 21 is placed at the lower inside of the C-frame 2. The arrangement alternatively can be vice versa. In a further alternative, the sensor 2 can also be arranged at another suitable place in the punching machine 1. The sensor 2 is connected to the evaluation device 15.

In use, the sensor 2 is enabled after the insert of the workpiece 12 into the punching machine 1 and the clamping by the clamping claws 11. Thereby, either the presence or the absence of the workpiece 12 at the predetermined position relative to the sensor 2 (here in the light beam 22) is detected.

Subsequently, as schematically shown in FIG. 2 in view A, the workpiece 12 is moved by means of the motion device of the punching machine 1 in a first predetermined direction R. The first predetermined direction is depending on the actual position of the coordinate slideway 7 and it is predetermined such that an edge of the workpiece 12 attached to the coordinate slideway 7 enters the detection area of the sensor 2. In the view A, a presence of the workpiece 12 is detected since the light beam is interrupted.

Then, the workpiece 12 is displaced in the first predetermined direction as long as, as shown in view B, a first change of state here, since the light beam 22 is not interrupted anymore, a change of state from a presence of the workpiece 12 to an absence is detected. Thereby, a first workpiece edge 23 is detected. Thereby, as appropriate, by multiple reciprocating at this position in the first predetermined direction R for increasing the precision, a first position of the workpiece 12 is detected by the position of the coordinate slideway 7 and transmitted to the evaluation device 15. By a horizontal moving of the workpiece 12 in a direction perpendicular to the first predetermined direction R, an angular error of the first workpiece edge 23 is optionally detected.

Then, as shown in view C, the workpiece 12 is moved in a direction (direction of arrow in view C) opposite to the first predetermined direction R if the sensor 2, as shown in view A, has detected a presence of the workpiece 12 before the first change of state. On the other hand, the workpiece 12 is moved further in the first predetermined direction R if the sensor 2 has detected an absence of the workpiece 12 before the first change of state. Thus, it is possible that the unprocessed workpiece 12 is moved such that an opposite second workpiece edge 24 is detected.

The workpiece 12 is moved in this direction as long as, as shown in view D, a second change of state is detected, whereby the second workpiece edge 24 is detected. Thereby, as appropriate, also by multiple reciprocating at this position in the first predetermined direction R for increasing the precision, a second position of the workpiece 12 is detected by the position of the coordinate slideway 7 and transmitted to the evaluation device 15. Also here, an angular error of the second workpiece edge 24 is optionally detected by a horizontal moving of the workpiece 12 in a direction perpendicular to the first predetermined direction R.

Then, the evaluation device 15 determines the overall dimension of the workpiece 12 in the first predetermined direction from the distance, i.e., a difference of coordinates of the first position of the coordinate slideway 7 and the second position of the coordinate slideway 7.

Optionally, there is the possibility to detect the dimensions also in alternative directions, e.g., in order to detect the size of the workpiece 12 not only in one direction but to detect the size and, as appropriate, a position, also in alternative directions.

FIG. 3 schematically shows the workpiece 12 fixed by means of the clamping claws 11 to the carriage 8 of the motion device. The detection of the overall dimension of the workpiece 12 in a second predetermined direction R' perpendicular to the first predetermined direction R is carried out analogously to the detection of the first workpiece edge 23 and the second workpiece edge 24 in the first predetermined direction R.

The workpiece 12 is moved in a second predetermined direction R' by means of the motion device. The second predetermined direction R' depends on the actual position of the coordinate slideway 7 and it is predetermined such that an edge of the workpiece 12 attached to the coordinate slideway 7 enters the detection range of the sensor 2.

Then, the workpiece 12 is moved in the second predetermined direction R' as long as a third change of state is detected. Thereby, a third workpiece edge 25 is detected. Thereby, as appropriate, also by multiple reciprocating at this position in the second predetermined direction R' for increasing the precision, a third position of the workpiece 12 is detected by the position of the coordinate slideway 7 and transmitted to the evaluation device 15. Here, by a horizontal moving of the workpiece 12 in a direction perpendicular to the second predetermined direction R', an angular error of the third workpiece edge 25 is optionally detected.

Then, the workpiece 12 is moved again by means of the motion device in a direction opposite to the second predetermined direction R'. Thus, it is possible that the unprocessed workpiece 12 is moved such that an opposite fourth workpiece edge 26 is detected.

The workpiece 12 is moved in this direction as long as a fourth change of state is detected, whereby the fourth workpiece edge 26 is detected. Thereby, as appropriate, by multiple reciprocating at this position in the second predetermined direction R' for increasing the precision, a fourth position of the workpiece 12 is detected by the position of the coordinate slideway 7 and transmitted to the evaluation device 15. Here, by a horizontal moving of the workpiece 12 in a direction perpendicular to the second predetermined direction R', an angular error of the fourth workpiece edge 26 is optionally detected.

Then, the evaluation device 15 detects the overall dimension of the workpiece 12 in the second predetermined direction from the distance, i.e., a difference of coordinates, of the third position of the coordinate slideway 7 and the fourth position of the coordinate slideway 7.

Alternatively or optionally, detection in directions different from perpendicular to the first predetermined direction is possible. This is in particular advantageous, if the dimensions of workpieces having another shape other than a rectangular shape, e.g., a hexagonal shape, are detected.

The overall dimensions of in particular the first workpiece 12 of an order to be processed by the punching machine 1 are detected in order to ensure that the correct material for this order is provided. Alternatively, also a first workpiece 12 of a new supply batch for an already ongoing production order can be detected to ensure that the correct material is furthermore provided. If overall dimensions of the workpiece 12 are detected which are not conform to the predetermined overall dimension, the supply batch is back stored and another supply batch having the predetermined overall dimensions is obtained from the storing place. After the detection of overall dimensions of the first workpiece 12 of the new supply batch, the overall dimensions of a second workpiece 12 or of further workpieces 12 are optionally detected in order to determine whether the overall dimensions of merely the first workpiece 12 of the supply batch or if the overall dimensions of further or of all of the workpieces 12 of the supply batch do not conform to the predetermined overall dimensions. As the case may be, if no workpieces, the overall dimensions of which conforming to the predetermined overall dimensions are available, the order to be processed is skipped and a next order is processed so that the punching machine 1 continuously produces.

Optionally, the evaluation device 15 compares the overall dimensions determined by evaluation device 15 with the predetermined overall dimension and prevents machining of the workpiece 12 if a difference between the dimension determined by the evaluation unit 15 and the predetermined dimension is larger than a predetermined difference value. Then, an announcement that the difference is larger than a predetermined difference value is optionally carried out on the display device 19. The predetermined difference value is manually input at the input unit 18 into the control computer 14. Alternatively, the control computer 14 is connected to a data processing device outside the processing machine 1 and the predetermined difference value is input into the control computer 14 by a production planning program.

By the production planning program, dead zones are determined with respect to the overall dimensions of the workpiece 12. The dead zones are areas on the workpiece 12, which are determined with respect to the workpiece 12, in which no processing may be carried out and in which the tool may not be entered. These areas are, e.g., clamping areas of the clamping claws 11 and areas around the clamping claws 11. These areas are excluded from processing since, otherwise, a collision of a tool and the clamping claws 11 may happen and the tool or the punching machine 1 may be damaged. If a workpiece 12 having overall dimensions which do not conform to the predetermined overall dimensions is accommodated in the punching machine 1, the actual dead zones do not conform to the determined dead zones. Thereby, there is the risk of violation of the dead zone, whereby the workpiece 12 is entered into one of the dead zones. This causes a damage of the tool or of the punching machine. Therefore, the punching machine 1 optionally comprises a dead zone monitoring device, e.g., a sensor, or the actual dead zones are stored in the control computer 14 and the punching machine 1 is stopped due to a violation of the dead zone.

Besides the determination of the size of the workpiece, a determination of the position of the workpiece 12 in the punching machine 1 is optionally possible.

For processing the workpiece, the carriage 8 of the coordinate slideway 7 on which the workpiece 12 is held by means of the clamping claws 11 moves in a X-direction into a programmed position for punching and the guide rail 9 moves in Y-direction in the programmed position, whereby the workpiece 12 slides over the sheet metal support 13. Then, a punching stroke is performed by the press device 6. Subsequently, the next punching or processing position is approached according to the same principle.

A number of embodiments of the invention have been described. Nevertheless, it will be understood that various modifications may be made without departing from the spirit and scope of the invention. Accordingly, other embodiments are within the scope of the following claims.

What is claimed is:

1. A method of detecting an overall dimension of a plate-shaped workpiece to be processed on a workpiece processing machine by a non-contact sensor, the method comprising:

moving, by a motion device of the workpiece processing machine, the workpiece in a first predetermined direction until the sensor detects a first workpiece edge of the workpiece by a first change of state when the workpiece is moved to a first particular position in the first predetermined direction, wherein the sensor is configured to detect a presence and an absence of the workpiece and a change of state between the presence and the absence at a predetermined position of the workpiece relative to the sensor;

causing first multiple reciprocal relative motions between the sensor and the workpiece with the sensor at the first workpiece edge by moving the workpiece back and forth across the first particular position, such that a change of state happens at each of the first multiple reciprocal relative motions;

detecting, by an evaluation device coupled to the sensor, a first position of the workpiece associated with the first change of state and the changes of state of the first multiple reciprocal relative motions;

moving, by the motion device, the workpiece in a direction toward a second workpiece edge of the workpiece until the sensor detects the second workpiece edge by a second change of state when the workpiece is moved to a second particular position in the direction toward the second workpiece edge;

causing second multiple reciprocal relative motions between the sensor and the workpiece with the sensor at the second workpiece edge by moving the workpiece back and forth across the second particular position, such that a change of state happens at each of the second multiple reciprocal relative motions;
detecting, by the evaluation device, a second position of the workpiece associated with the second change of state and the changes of state of the second multiple reciprocal relative motions; and then
determining a first overall dimension of the workpiece by a determination of a first distance between the first position and the second position of the workpiece,
wherein moving the workpiece in a direction toward a second workpiece edge of the workpiece comprises:
sensing with the sensor an absence or a presence of the workpiece before the first change of state; and
based on sensing the absence or the presence of the workpiece before the first change of state, moving the workpiece in a direction associated with the first predetermined direction towards the second workpiece edge of the workpiece.

2. The method of claim 1, wherein moving the workpiece in a direction toward a second workpiece edge of the workpiece comprises:
sensing with the sensor the absence of the workpiece before the first change of state; and
moving the workpiece in the first predetermined direction towards the second workpiece edge of the workpiece.

3. The method of claim 1, wherein moving the workpiece in a direction toward a second workpiece edge of the workpiece comprises:
sensing with the sensor the presence of the workpiece before the first change of state; and
moving the workpiece in a direction opposite to the first predetermined direction towards the second workpiece edge of the workpiece.

4. A method of detecting an overall dimension of a plate-shaped workpiece to be processed on a workpiece processing machine by a non-contact sensor, the method comprising:
moving, by a motion device of the workpiece processing machine, the workpiece in a first predetermined direction until the sensor detects a first workpiece edge of the workpiece by a first change of state when the workpiece is moved to a first particular position in the first predetermined direction, wherein the sensor is configured to detect a presence and an absence of the workpiece and a change of state between the presence and the absence at a predetermined position of the workpiece relative to the sensor;
causing first multiple reciprocal relative motion between the sensor and the workpiece with the sensor at the first workpiece edge by moving the workpiece back and forth across the first particular position, such that a change of state happens at each of the first multiple reciprocal relative motions;
detecting, by an evaluation device coupled to the sensor, a first position of the workpiece associated with the first change of state and the changes of state of the first multiple reciprocal relative motions;
moving, by the motion device, the workpiece in a direction toward a second workpiece edge of the workpiece until the sensor detects the second workpiece edge by a second change of state when the workpiece is moved to a second particular position in the direction toward the second workpiece edge;
causing second multiple reciprocal relative motion between the sensor and the workpiece with the sensor at the second workpiece edge by moving the workpiece back and forth across the second particular position, such that a change of state happens at each of the second multiple reciprocal relative motions;
detecting, by the evaluation device, a second position of the workpiece associated with the second change of state and the changes of state of the second multiple reciprocal relative motion; and then
determining a first overall dimension of the workpiece by a determination of a first distance between the first position and the second position of the workpiece;
after moving the workpiece in the first predetermined direction until the sensor detects the first workpiece edge, moving the workpiece in a direction perpendicular to the first predetermined direction; and
detecting, by the evaluation device, an angular error of the first workpiece edge,
wherein moving the workpiece in a direction toward a second workpiece edge of the workpiece comprises:
sensing with the sensor an absence or a presence of the workpiece before the first change of state; and
based on sensing the absence or the presence of the workpiece before the first change of state, moving the workpiece in a direction associated with the first predetermined direction towards the second workpiece edge of the workpiece.

5. The method of claim 4, further comprising:
after moving the workpiece in a direction toward the second workpiece edge, moving the workpiece in the direction perpendicular to the first predetermined direction; and
detecting, by the evaluation device, an angular error of the second workpiece edge.

6. The method of claim 1, wherein the motion device includes a coordinate slideway,
wherein the first position is detected in relation to a first coordinate position of the coordinate slideway and the second position is detected in relation to a second coordinate position of the coordinate slideway, and
wherein the distance between the first position and the second position is determined as a comparison of coordinates of the first coordinate position and coordinates of the second coordinate position.

7. The method of claim 1, wherein the sensor is a light barrier having an emitter and a receiver.

8. The method of claim 1, wherein the sensor is a light barrier having an emitter, a receiver and a reflector.

9. The method of claim 1, wherein the workpiece includes a ferromagnetic material and the sensor is an inductive proximity switch.

10. The method of claim 1, wherein the sensor is a capacitive sensor.

11. The method of claim 1, wherein the sensor is a pneumatic sensor.

12. The method of claim 1, further comprising:
moving, by the motion device, the workpiece in a second predetermined direction until the sensor detects a third workpiece edge of the workpiece by a third change of state;
detecting, by the evaluation device, a third position of the workpiece corresponding to the third change of state;
moving, by the motion device, the workpiece in a direction toward a fourth workpiece edge of the workpiece until the sensor detects the fourth workpiece edge by a fourth change of state;
detecting, by the evaluation device, a fourth position of the workpiece corresponding to the fourth change of state; and determining, by the evaluation device, a second overall dimension of the workpiece by a determination of a second distance between the third position and the fourth position of the workpiece.

13. The method of claim 12, wherein moving the workpiece in a direction toward the fourth workpiece edge of the workpiece comprises one of:
sensing with the sensor an absence of the workpiece before the third change of state and moving the workpiece in the second predetermined direction in a direction toward the fourth workpiece edge, and
sensing with the sensor a presence of the workpiece before the third change of state and moving the workpiece in a direction opposite to the second predetermined direction toward the fourth workpiece edge.

14. The method of claim 1, further comprising:
comparing the determined overall dimension of the workpiece to a predetermined overall dimension; and,
upon determining that a difference between the determined overall dimension and the predetermined overall dimension is larger than a predetermined difference value, preventing processing of the workpiece.

15. The method of claim 14, further comprising:
in response to determining that the difference is larger than the predetermined difference value, displaying an announcement.

16. The method of claim 14, wherein the predetermined difference value is an input to a production planning program.

17. The method of claim 1, wherein the workpiece is a first workpiece of an order to be processed on the workpiece processing machine.

18. The method of claim 1, wherein the workpiece is a first workpiece of a new supply batch of workpieces to be processed.

19. The method of claim 1, further comprising: determining a size of the workpiece by determining the overall dimension of the workpiece.

20. The method of claim 1, further comprising:
determining a position of the workpiece in the workpiece processing machine by detecting the first position and the second position of the workpiece.

21. A method of detecting an overall dimension of a plate-shaped workpiece to be processed on a workpiece processing machine by a non-contact sensor, the method comprising:
moving, by a motion device of the workpiece processing machine, the workpiece in a first predetermined direction until the sensor detects a first workpiece edge of the workpiece by a first change of state, wherein the sensor is configured to detect a presence and an absence of the workpiece and a change of state between the presence and the absence at a predetermined position of the workpiece relative to the sensor;
causing reciprocal relative motion between the sensor and the workpiece with the sensor at the first workpiece edge;
detecting, by an evaluation device coupled to the sensor, a first position of the workpiece associated with the first change of state;
moving, by the motion device, the workpiece in a direction toward a second workpiece edge of the workpiece until the sensor detects the second workpiece edge by a second change of state;
causing reciprocal relative motion between the sensor and the workpiece with the sensor at the second workpiece edge;
detecting, by the evaluation device, a second position of the workpiece associated with the second change of state; and then
determining a first overall dimension of the workpiece by a determination of a first distance between the first position and the second position of the workpiece;
comparing the determined overall dimension of the workpiece to a predetermined overall dimension; and
upon determining that a difference between the determined overall dimension and the predetermined overall dimension is larger than a predetermined difference value, preventing processing of the workpiece, wherein the predetermined difference value is an input to a production planning program,
wherein moving the workpiece in a direction toward a second workpiece edge of the workpiece comprises:
sensing with the sensor an absence or a presence of the workpiece before the first change of state; and
based on sensing the absence or the presence of the workpiece before the first change of state, moving the workpiece in a direction associated with the first predetermined direction towards the second workpiece edge of the workpiece.

* * * * *